Figure 1:
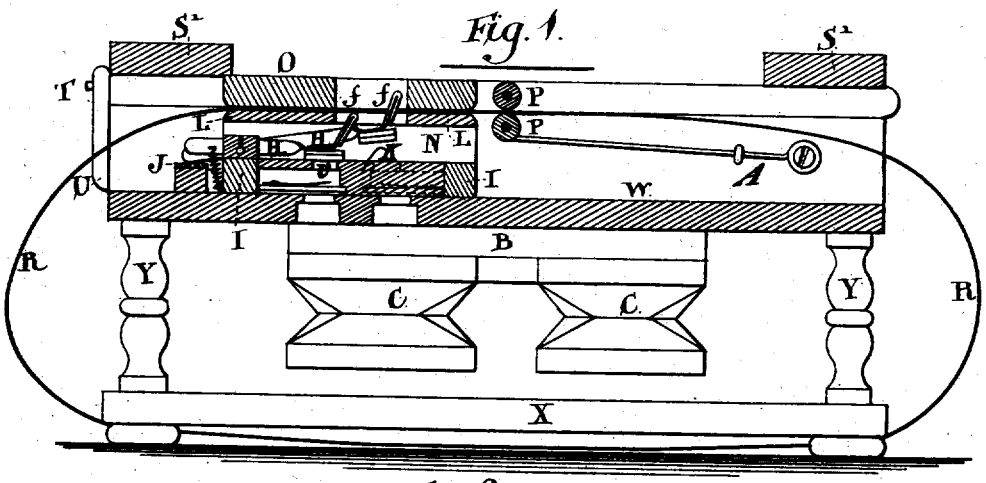

M. J. MATTHEWS, Dec'd,

THE MECHANICAL ORGUINETTE COMPANY, assignee.

MECHANICAL MUSICAL INSTRUMENT.

No. 9,914. Reissued Oct. 25, 1881.

Witnesses:-

Louis A. Lehikhead.

Fred Haynes

Inventor:-

Moses J. Matthews by Geo Ottomayer

Brown & Pierson

N. PETERS, Photo-Lithographer, Washington, D.C.

UNITED STATES PATENT OFFICE.

THE MECHANICAL ORGUINETTE COMPANY, OF NEW YORK, N. Y., ASSIGNEE OF MASON J. MATTHEWS, DECEASED.

MECHANICAL MUSICAL INSTRUMENT.

SPECIFICATION forming part of Reissued Letters Patent No. 9,914, dated October 25, 1881.

Original No. 204,352, dated May 28, 1878. Application for reissue filed September 1, 1880.

*To all whom it may concern:*

Be it known that I, MASON J. MATTHEWS, formerly of Boston, in the county of Suffolk and State of Massachusetts, and later of the city and county of New York, in the State of New York, have invented certain new and useful Improvements in Mechanical Musical Instruments, of which the following is a specification.

The invention relates to mechanical wind-instruments in which a traveling music-sheet is used to produce music automatically.

The invention consists in the combination, in a mechanical musical instrument, of a body provided with sound-producing devices and their appurtenances, a music-sheet controlling the operation of the sound-producing devices, and a top frame comprising a pressure-cap for bearing on the music-sheet, and capable of being moved away from the body to facilitate the insertion and removal of the music-sheet.

It also consists in the combination, in a mechanical musical instrument, of a body provided with sound-producing devices and their appurtenances, a music-sheet, and guide-rails above the body for the music-sheet capable of being moved away from the body to facilitate the insertion and removal of the music-sheet.

It also consists in the combination, with an endless perforated music-sheet and valves for controlling the operation of sound-producing devices, of guide-rails for the music-sheet.

It also consists in the combination, in a mechanical musical instrument, of a body provided with sound-producing devices, a music-sheet for controlling the operation of the sound-producing devices, a rest for the music-sheet elevated above the body, and feed-rollers for imparting motion to the music-sheet, having their adjacent surfaces elevated above the said body.

It also consists in the combination of the parts last named and guide-rails capable of being moved away from the aforesaid body.

It also consists in the combination, in a mechanical musical instrument, of a body, sound-producing devices, a music-sheet controlling the operation of the same, and a feed-roller constituting a driving-shaft, and capable of being moved away from said body to facilitate the insertion and removal of the music-sheet.

It also consists in the combination, with reeds and their air passages or ducts, together with a series of valves, constructed substantially as hereinafter particularly described, for controlling the passage of air through the latter, of a continuous roll or belt of paper.

It also consists in the combination, in a mechanical musical instrument, of sound-producing devices and series of openings leading to chambers therefor, arranged so that the openings in each series will be opposite the spaces between the openings in the adjacent series, whereby economy of space is attained.

It also consists in a mechanical musical instrument comprising sound-producing devices and a music-sheet adapted to produce a tune, the said sound-producing devices being arranged in alternate positions in two rows.

It also consists in the combination, in a mechanical musical instrument, of a bellows, mechanism for operating the same, and an elastic or yielding connection between said operating mechanism and said bellows.

It also consists in the combination, in a mechanical musical instrument, of a bellows, an elastic or spring arm extending therefrom, and a lever connected to said arm and serving as a means of transmitting motion to the bellows.

It also consists in the combination, in a mechanical musical instrument, of sound-producing devices, bellows for operating the same, a music-sheet for controlling the operation thereof, a feed-roller for imparting motion to said music-sheet, and an oscillating connection pivoted to a stationary support and extending beyond the range of the sound-producing devices and the path traveled by the music-sheet to and operating the bellows.

It also consists in a top frame for a mechanical musical instrument consisting of two parallel side bars and cross rails or stretchers connecting the same at some distance above their lower edges.

It also consists in the combination, in a mechanical musical instrument, of a body provided with hooks and a top frame provided with catches with which said hooks engage.

It also consists in the combination, in a mechanical musical instrument, with a perforated music-sheet, of a frame which is removable from said music-sheet and carries one of the feed-rollers thereof.

It also consists in the combination, in a mechanical musical instrument with a perforated music-sheet, of a frame which is removable from said music-sheet and carries one of the feed-rollers and also a pressure-cap.

It also consists in a mechanical musical instrument having a removable guide-frame which directs the movement of the perforated music-sheet.

It also consists in the combination, with a mechanical musical instrument and a perforated music-sheet operating the same, of a pressure-cap and a removable support for said cap, for the purpose of allowing it to be raised above the reed-board.

It also consists in the combination, in a mechanical musical instrument, of a body, sound-producing devices, a music-sheet controlling their operation, a feed-roller for the music-sheet above said body, bellows below the body, and a connection between said feed-roller and bellows for operating the latter.

It also consists in the combination, in a mechanical musical instrument, of sound-producing devices, bellows for operating the same, a music-sheet controlling their operation, a driving-shaft for imparting motion to the music-sheet and capable of being moved away from the music-sheet, and a connection between the said shaft and the bellows providing for the disengagement of the driving-shaft from the bellows when said shaft is moved away from the music-sheet.

It also consists in the combination of friction-rollers, a perforated music-sheet, and valves for controlling the operation of sound-producing devices.

Figure 2:
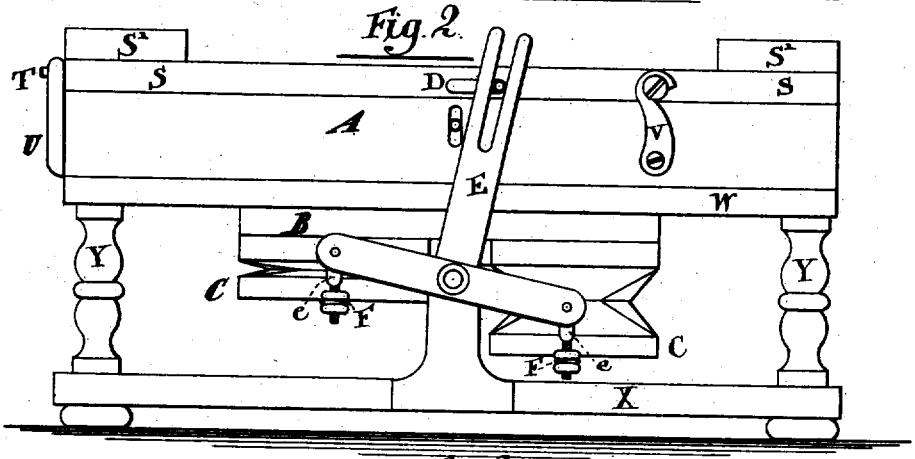
Figure 3:
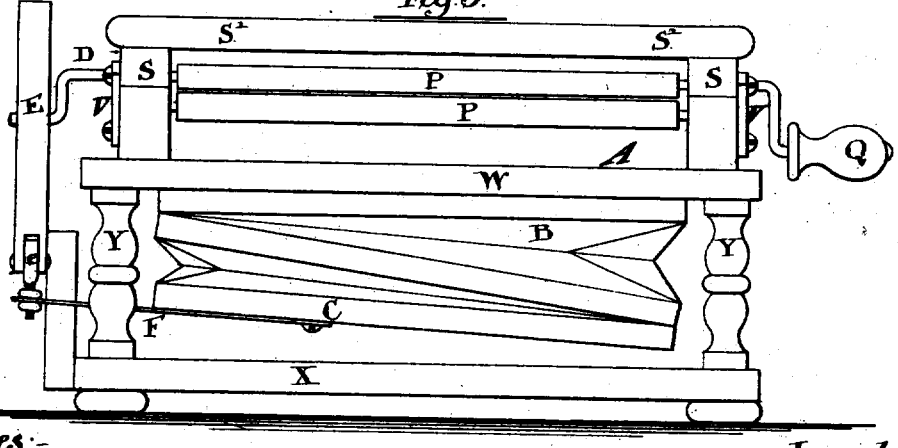

In the accompanying drawings, Figure 1 is a sectional elevation of one of the sides of the instrument, representing the reed-board, chamber-cap, pressure-cap, and bellows. Fig. 2 is an elevation of one side of the instrument, representing the manner in which the bellows are operated; and Fig. 3 is an elevation of one of its ends with the music removed.

A designates the body of the instrument, B the reservoir, and C C the bellows.

The reservoir B is mounted on the under face of the platform W of the body A.

The bellows C C are mounted on the lower board of the reservoir B. This is a simple and compact form of construction, involving the employment of the least possible space, and requiring no supplementary wind-chest, such as is ordinarily employed in reed-instruments. The bellows C C are operated by the crank D through the medium of the three-armed lever E, pivoted to the side of the case or body, which constitutes a stationary support therefor, and the toggles *e* and wire projections F, forming a connection at the side of the body A and beyond the range of the sound-producing devices and path traveled by the music-sheet.

As the bellows and the music-sheet are both operated by the same handle, it is necessary that some provision should be made to prevent the jerking that would be consequent upon a continuous turning of the handle when the reservoir is exhausted. This is secured by the elastic wire projections F.

The tube-board or chest for the reeds or sound-producing devices is constructed similar to that of a key-board cabinet-organ. The tubes are not directly opposite each other, but are arranged and located so that the tubes or chambers of one row are opposite the partitions or spaces between the tubes of the other row. The reeds are inserted in these tubes in alternate succession, each consecutive reed in the scale being in a different row. The object of this arrangement is to bring the push-points *f f* of the valves H H as close together as is practicable, so that there may be used a narrower sheet of paper than would be necessary for the same number of reeds if they were all located in one row. The mouths of the tubes are closed by the strips I I, and holes transverse to the reed tubes or chambers are made through them directly over the reeds. These holes are controlled by the valves H H, which are approximately parallel with the reeds. The springs J tend to keep the valves H H away from their seats.

Screwed or otherwise fastened to the top of the tube-board K is a chamber-cap, L, forming a rest for the music-sheet elevated above the board or platform W. The valves are all mounted within the chamber N.

Through the top of the chamber-cap L are a series of holes corresponding to the push-points *f f* of the valves H H. There is also a series of holes through the pressure-cap O corresponding to the series of holes through the chamber-cap L. The pressure-cap O is held down by a spring of sufficient strength to resist the force of the springs J, and holds the music-sheet to the rest therefor. The perforated music-sheet is inserted between the pressure-cap O and the chamber-cap L, and between the friction-rollers P P, so that when the handle Q is turned the rollers P P draw the perforated sheet R along and over the push-points *f f* of the valves H H, and thus holds them closely to their seats, excepting at intervals provided for by the perforations.

The upper feed-roller P, being provided with a handle, Q, constitutes the driving-shaft of the instrument. The meeting surfaces of these rollers are approximately on a level with the rest for the music-sheet, so that in operating they will not tend to lift the music-sheet off the rest. The upper feed-roller forms the driving-shaft of the instrument, as before stated, and the lower roller is adjustable and impelled by a spring or springs toward it. The exhaust power of the bellows, combined with the perforated sheet, keeps the valves on their seats.

The springs J are little more than strong enough to resist the wind force exerted on the valves H H, so that the friction of the push-points *f f* on the perforated sheet is very slight. The two ends of the perforated sheet R are joined together, so as to form a continuous band or roll, passing over the chamber-cap L around each end and between the feet of the instrument.

Provision for facilitating the mounting and removal of the perforated sheet R is made in the movable guide or side rails, S. In one end of each guide-rail S is a stud, T. This stud T passes into a hole in the holder U. The other end of each guide-rail is held down by a hook, V, upon the body of the instrument, engaging with a catch or pin on the guide-rail. The guide-rails S are held together by the cross-rails S′ at some distance above their lower edges, so that the whole forms an easily-handled frame, which constitutes a support for the pressure-cap. The guide-rails S and the cross-rails S′ form what may be termed a "top frame," which may be detached or moved away from the body of the instrument. As the upper feed-roller or driving-shaft is supported in this top frame, it may also be moved away or detached from the body of the instrument. The pressure-cap O, being arranged in this top frame, is likewise removable and is adjustable.

The platform W of the body A of the instrument is mounted on legs or pillars Y, so that the bellows and action which operates them are exposed to view and elevated so as to leave room for action. The case or body may be of any suitable design.

The base-board X may be dispensed with, and the action might be supported on legs only. Instead of the turned pillars square posts might be used, and wire-gauze neatly stenciled might be stretched around them so as to cover in all sides and conceal the bellows, or the whole action might be incased in wood. The bellows might be mounted so that their movements would be parallel with the sides of the instrument, or in any other desirable position, so that they might be operated by pulleys and cord in connection with a crank, or by friction-pulleys and crank, or they might be operated by a rocking shaft mounted below them and connected to the crank. The tube-board might be constructed so that the reeds inserted therein would stand in a vertical position and the valves rest on the mouths of the tubes instead of as shown.

The valves H H may be made of either metal or wood, and they may be hinged with leather or other suitable material. Perforated paper has been used in connection with valves and levers, and therefore the mere combination of such sheets with valves or with levers is not here claimed; but

What is claimed as the invention, and desired to be secured by Letters Patent, is—

1. In a mechanical musical instrument, the combination of a body provided with sound-producing devices and their appurtenances, a music-sheet controlling the operation of the sound-producing devices, and a top frame comprising a pressure-cap for bearing on the music-sheet, and capable of being moved away from the body to facilitate the insertion and removal of the music-sheet, substantially as specified.

2. In a mechanical musical instrument, the combination of a body provided with sound-producing devices and their appurtenances, a music-sheet, and guide-rails for the music-sheet capable of being moved away from the body to facilitate the insertion and removal of the music-sheet, substantially as specified.

3. In combination with an endless sheet of perforated paper and the valves H H, the removable guide-rails S, substantially as specified.

4. In a mechanical musical instrument, the combination of a body provided with sound-producing devices, a music-sheet for controlling the operation of the sound-producing devices, a rest for the music-sheet elevated above the body, and feed-rollers for imparting motion to the music-sheet, having their adjacent surfaces elevated above the said body, substantially as specified.

5. In a mechanical musical instrument, the combination of a body provided with sound-producing devices, a music-sheet for controlling the operation of the sound-producing devices, a rest for the music-sheet elevated above the body, feed-rollers for imparting motion to the music-sheet, having their adjacent surfaces elevated above said body, and guide-rails capable of being moved away from said body, substantially as specified.

6. In a mechanical musical instrument, the combination of a body, sound-producing devices, a music-sheet for controlling the operation of the same, and a feed-roller constituting a driving-shaft, and capable of being moved away from the said body to facilitate the insertion and removal of the music-sheet, substantially as specified.

7. In combination with reeds and their air-passages, together with a series of valves, H H, constructed substantially as described, a continuous roll of perforated paper, all as and for the purpose specified.

8. In a mechanical musical instrument, the combination of sound-producing devices and series of openings leading to chambers therefor, arranged so that the openings in each series will be opposite the spaces between the openings in the adjacent series, substantially as specified.

9. In a mechanical musical instrument, sound-producing devices and a music-sheet adapted to produce a tune, the sound-producing devices being arranged in alternate positions in two rows, substantially as specified.

10. The combination, in a mechanical musical instrument, of a bellows, mechanism for operating the same, and an elastic or yielding connection between said operating mechanism and said bellows, substantially as specified.

11. The combination, in a mechanical musical instrument, of a bellows, an elastic or yielding arm extending therefrom, and a lever connected to said arm and serving as a means of transmitting motion to said bellows, substantially as specified.

12. In a mechanical musical instrument, the combination of sound-producing devices, bellows for operating the same, a music-sheet controlling their operation, a feed-roller for imparting motion to said music-sheet, and an oscillating connection pivoted to a stationary support and extending beyond the range of the sound-producing devices and path traveled by the music-sheet to and operating the bellows, substantially as specified.

13. In a mechanical musical instrument, a top frame consisting of two parallel side bars and cross-rails connecting the same at some distance from their lower edges, substantially as specified.

14. In a mechanical musical instrument, the combination of a body provided with hooks and a top frame provided with catches with which said hooks engage, substantially as specified.

15. In a mechanical musical instrument, the combination, with a perforated music-sheet, of a frame which is removable from said music-sheet and carries one of the feed-rollers, substantially as specified.

16. In a mechanical musical instrument, the combination, with a perforated music-sheet, of a frame which is removable from said music-sheet and carries one of the feed-rollers, and also a pressure-cap, substantially as specified.

17. In a mechanichl musical instrument, a removable guide-frame which directs the movement of the perforated music-sheet, substantially as specified.

18. In combination with a mechanical musical instrument and a perforated music-sheet operating the same, a pressure-cap and removable support for said cap for allowing it to be raised above the reed-board, substantially as specified.

19. The combination and arrangement of the friction-rollers P P and three-armed lever E with the adjustable toggles *e* and bellows C C, when constructed and arranged substantially as specified.

20. In a mechanical musical instrument, the combination of a body, sound-producing devices, a music-sheet controlling their operation, a feed-roller for the music-sheet above said body, bellows below the body, and a connection between the said feed-roller and bellows arranged and adapted to operate the latter, substantially as specified.

21. In a mechanical musical instrument, the combination of sound-producing devices, bellows for operating the same, a music-sheet controlling their operation, a driving-shaft for imparting motion to the music-sheet and capable of being moved away from the music-sheet, and a connection between said shaft and the bellows providing for the disengagement of the driving-shaft from the bellows when the said shaft is moved away from the music-sheet, substantially as specified.

22. The combination of the friction-rollers P P and perforated paper R with the valves H H, substantially as specified.

MASON J. MATTHEWS.

Witnesses:
M. A. MADDEN,
CHARLES H. HOLDEN.